UNITED STATES PATENT OFFICE.

JOSEPH M. SMITH, OF MANCHESTER, NEW HAMPSHIRE.

IMPROVEMENT IN COVERINGS FOR DRAWING-ROLLS.

Specification forming part of Letters Patent No. 17,754, dated July 7, 1857.

*To all whom it may concern:*

Be it known that I, JOSEPH M. SMITH, of Manchester, in the county of Hillsborough and State of New Hampshire, have invented an Improved Covering for Drawing or Draft Rollers, of which the following is a full, clear, and exact description.

Efforts have frequently been made to employ india-rubber as a covering for drawing-rollers, but thus far without success, the electricity developed by this substance rendering it unsuitable for the purpose. Were it not for this quality, and for the fact that the surface of the rollers, as heretofore prepared, soon becomes softened and sticky, no substance would be better adapted to the purpose, on account of its peculiar elasticity and durability.

My invention has for its object to divest the india-rubber of this power of generating and retaining electricity; and it consists in incorporating therewith a portion of pulverized plumbago or black-lead previous to vulcanizing, the india-rubber being otherwise prepared in a manner at present well known.

I will first describe the preparation of the india-rubber, and then the manufacture of the roller itself.

The ingredients employed are twenty-five pounds india-rubber, five pounds magnesia, four pounds sulphur, twelve pounds black-lead. These ingredients are united by grinding in the ordinary way—the proportion of the black-lead not being rigid, as one-half less or more than the above quantity has been found to answer the purpose. Two or three layers of fine cotton cloth are wound diagonally upon an iron mandrel and cemented together by india-rubber, as in the ordinary process of manufacturing hose. Upon this foundation a single thickness or layer of the above composition of india-rubber, magnesia, sulphur, and black-lead is laid, as follows: After being thoroughly ground and mixed, the composition is formed into a sheet one-twelfth of an inch in thickness, or thereabout. The sheet thus formed is cut into strips of a suitable width to surround the cotton tube upon the mandrel, the edges being chamfered, so as to form a perfect joint. Over this composition are tightly wound several thicknesses of cotton cloth, to hold the tube in shape while it is being vulcanized, and after this process has been performed the cotton covering is removed and a perfect tube remains. This tube is then cut into short sections, which are secured to the drawing-roller by any suitable cement.

The roller thus prepared is found to be entirely free from the objections to which those heretofore made of india-rubber have been liable. It does not generate and retain electricity, the fibers do not adhere to its surface, and it possesses that exact degree of elasticity and hardness necessary to the most perfect operation of a drawing-roller.

The above roller is equally applicable to drawing-frames, speeders, stretchers, mules, or wherever sluices or ends are to be drawn or distended.

What I claim as my invention, and desire to secure by Letters Patent, is—

The use of black-lead, in combination with india-rubber, as a material for covering drawing or draft rollers, for the purpose of avoiding the effects of electricity and the adhesion of the cotton to the rollers, as set forth.

JOSEPH M. SMITH.

Witnesses:
  THOMAS A. DICKINSON,
  E. G. MERRILL.